United States Patent [19]

Tanaka

[11] Patent Number: 5,068,849

[45] Date of Patent: Nov. 26, 1991

[54] CYCLIC DATA TRANSMISSION METHOD

[75] Inventor: Yasuhiro Tanaka, Hyogo, Japan

[73] Assignee: Mitsubishi Denki Kabushiki Kaisha, Tokyo, Japan

[21] Appl. No.: 418,321

[22] Filed: Oct. 6, 1989

[30] Foreign Application Priority Data

Mar. 9, 1989 [JP] Japan .................................. 1-56709

[51] Int. Cl.$^5$ .............................................. H04J 3/02
[52] U.S. Cl. ................... 370/85.5; 370/85.4; 370/94.1; 370/85.12; 340/825.05
[58] Field of Search ................. 370/85.12, 85.15, 85.5, 370/85.4, 94.1, 94.2; 340/825.05

[56] References Cited

U.S. PATENT DOCUMENTS

| 4,482,999 | 11/1984 | Janson et al. | 370/85.5 |
| 4,539,679 | 9/1985 | Bux et al. | 370/85.4 |
| 4,914,652 | 4/1990 | Nguyen | 370/85.5 |
| 4,935,920 | 6/1990 | Taniguchi et al. | 370/55 |

OTHER PUBLICATIONS

"New Fiber Transmission Data Interface Standard (The Emerging FDDI Standard)," *Telecommunications*, vol. 21; No. 5, May, 1987.

*Primary Examiner*—Douglas W. Olms
*Assistant Examiner*—Dang Ton
*Attorney, Agent, or Firm*—Rothwell, Figg, Ernst & Kurz

[57] ABSTRACT

Disclosed is a cyclic data transmission method for updating a common cyclic memory in a decentralized control transmission method which executes both a synchronous transmission of cyclic data and an asynchronous transmission of events characterized in that high speed cyclic data and low speed cyclic data are integrated into a frame when a token is acquired, and the frame is always transmitted with a fixed frame length resulting in an amount of synchronous data always being made constant and enabling the token round target time to be set equal to a update time of a cyclic data. Furthermore, the method according to the present invention enables the device is made at low cost, improves throughput in event transmission and a good response characteristic is provided.

3 Claims, 4 Drawing Sheets

CYCLIC DATA TRANSMISSION METHOD

BACKGROUND OF THE INVENTION

1. Field of the Invention

This invention relates to a cyclic data transmission method, particularly for updating a common cyclic memory in decentralized control of both a synchronous transmission of cyclic data and an asynchronous transmission of events.

2. Description of the Prior Art

FIG. 1 is a block diagram showing an example of a station in a control data way for realizing a protocol, written in the paper entitled "New Fiber Transmission Data Interface Standard (The Emergining FDDI Standard)," *Telecommunications*, Vol. 21; No. 5, May, 1987.

The station shown in FIG. 1 is connected to a line 1 in a line connecting unit 2 and is provided with a media access unit 3 having a token round timer 3a and a token holding timer 3b, a buffer memory 4 having a transmitting buffer memory 4a and a receiving buffer memory 4b, a DMA transfer control unit 5, a cyclic memory 6, and an event transmission control unit 7, and furthermore, an external control device 8 is connected thereto.

FIG. 2 is a diagram showing a token frame 10. Reference symbol 10-SD is a start delimiter, 10-FC is a frame control, 10-DA is a destination address, 10-SA is a source address, 10-FCS is a frame check sequence, and 10-ED is an end delimiter.

Also, FIG. 3 is a diagram showing a data frame 11. Reference symbol 11-SD is a start delimiter, 11-FC is a frame control, 11-DA is a destination address, 11-SA is a source address, 11-INFO is an information area, 11-FCS is a frame check sequence, 11-ED is an end delimiter, and 11-FS is a frame status.

FIG. 4 shows a whole outline diagram of the control data way formed by using the stations. To a loop-like transmission line 12 are connected stations 9a, 9b, and 9c, each of which has the media access unit 3, the cyclic memory 6, and the event transmission control unit 7, and to each of which one connected external control devices 8a, 8b, and 8c as shown in FIG. 1.

In the case where two, that is, high speed and low speed, update periods are realized as update periods for the cyclic data, packet multiplexing has been adopted in the prior art. In other words, as shown in FIG. 5, the high speed cyclic data frame 5b and the low speed cyclic data frame 5d are separated from each other, written into the transmission buffer memory 4a in accordance with the respective update periods, and queued for with transmission.

In the case, the update period of the cyclic data is limited to the maximum value of the token rotation time.

Here, in order to satisfy the requirement of the update period of the high speed cyclic data 5b, the value of the target token rotation time (hereinafer referred to as TTRT) has to be determined and set. It is assumed that, in the worst case, the high speed cyclic data frame was only transmitted in the preceding rotation cycle; of the token, and in the following rotation cycle; of the token, the first station consumed all of the maximum possible asynchronous bands and moreover, all stations had requested to send of the high speed cyclic data frame and the low speed cyclic data frame. Therefore, the time required for one rotation of the token is shown by the following expression;

$$Tbh + Tbl + (TTRT - Tbh - Td)$$

where Td is the delay time required for the token to circulate the loop-like transmission line 12, Tbh is the update period of the high speed cyclic data 5b, and Tbl is the update period of the low speed cyclic date 5d. The total sum of the transmitting time for each cyclic data frame in the all stations is Tbh for the high speed cyclic data 5b and Tbl for the low speed cyclic data 5d, respectively.

This time has to satisfy the requirement of the update period of the high speed cyclic data. That is:

$$Tbh + Tbl + (TTRT - Tbh - Td) < Tth.$$

When this inequality is modified, the following inequality is obtained;

$$TTRT < Tth + Td - Tbl.$$

Accordingly, when $Tbl > Td$, then $TTRT < Tth$.

In other words, the token is required to circulate in a time shorter than the period required for the high speed cyclic data, and the ratio of Td to the rotation time of the token is increased and the asynchronous band is reduced.

Incidentally, the word "timeout" means that a timer counts down to zero. The word "reset" means that a timer is preset to an initial value to start timeout counting.

The conventional cyclic data transmission method is constituted as described above, and it has had a problem that since the update period of the high speed cyclic data (Tth) has to be set to a larger value than TTRT, the token is forced to circulate the ring-like transmission line more than the required number of rotations, and consequently, the transmission time of the asychoronous data is reduced to the amount of the propagation delay time of the ring-like transmission line.

SUMMARY OF THE INVENTION

An object of this invention is to provide a cyclic transmission method which ensures an update period of a cyclic data, and at the same time, improves throughput in event transmission.

Another object of this invention is to provide a cyclic data transmission method which performs transmission processing of high speed and low speed cyclic data in a faster time period, allowing the device to be manufactured at low cost.

A further object of this invention is to provide a cyclic data transmission method which facilitates time control of the transmission of synchronous frames.

The cyclic data transmission method of the present invention for accomplishing the above-mentioned objects integrates both high speed cyclic data and low speed cyclic data into one frame when the token is acquired, and transmits the frame with an always fixed frame length.

In other words, in the cyclic data transmission method according to this invention, an amount of synchronous data transmitted after acquiring the token is always constant, and the target token rotation time can be set equal to the update time of the cyclic data. As a result, there is sufficient time for the transmission of the asynchronous data and the like.

The above-mentioned and other objects and features of this invention will be clarified more precisely with the following detailed description made with reference to the accompanying drawings. But, the drawings are exclusively for illustrative purposes and do not restrict the scope of this invention.

DETAILED DESCRIPTION OF THE PREFERRED EMBODIMENTS

Hereinafter, preferred embodiments according to this invention will be described in detail with reference to accompanying drawings.

Figure 6:
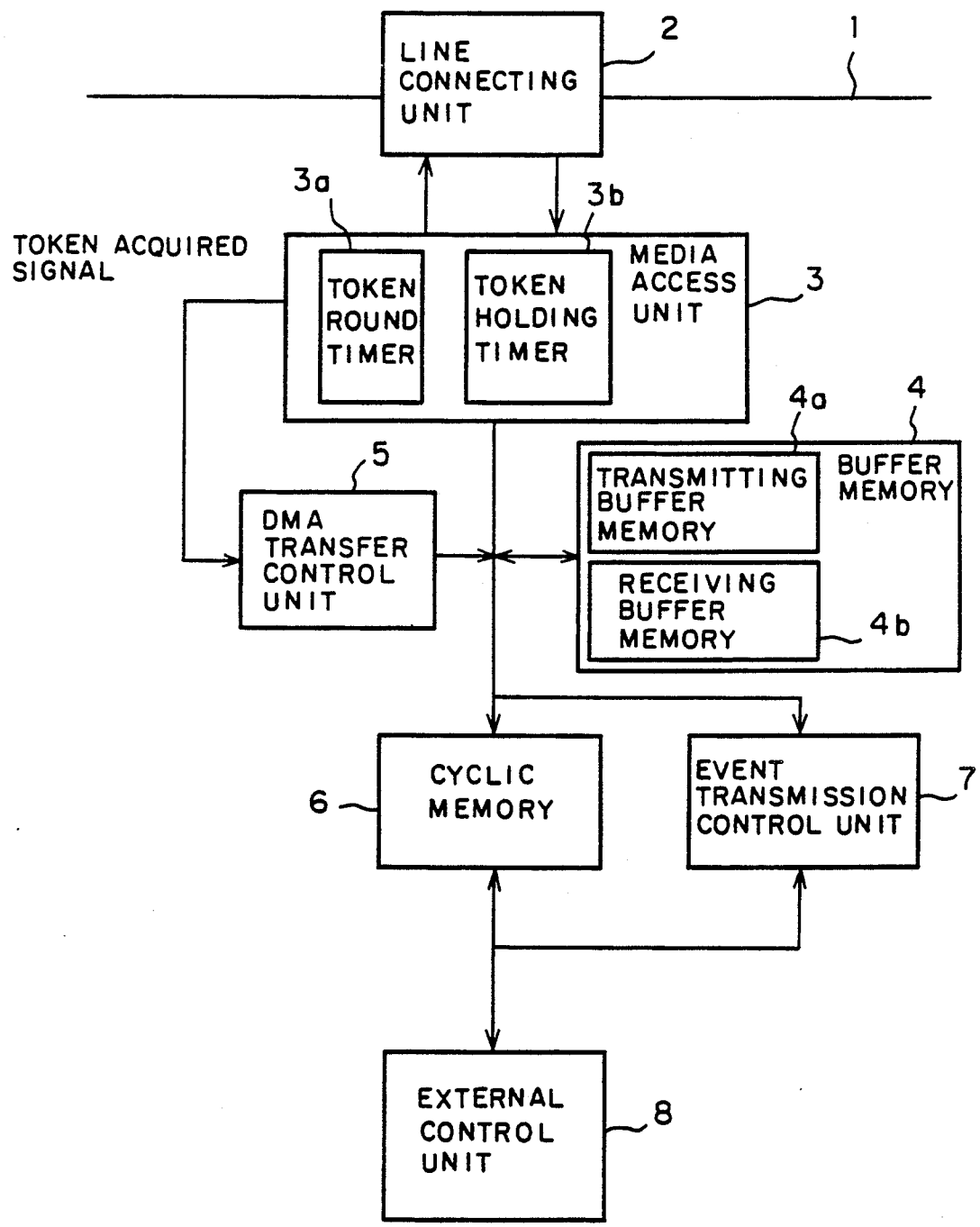
FIG. 6 is a block diagram showing a station in a control data way according to an embodiment of this invention.

In FIG. 6, a station is connected at a line connecting unit 2 to a loop-like line 1 and provided with a media access unit 3 having a token round timer 3a and a token holding timer 3b, a buffer memory 4 having a transmitting buffer memory 4a and a receiving buffer memory 4b, a DMA transfer control unit 5, a cyclic memory 6, and an event transmission control unit 7, and furthermore, an external control device 8 is connected thereto.

Figure 1:
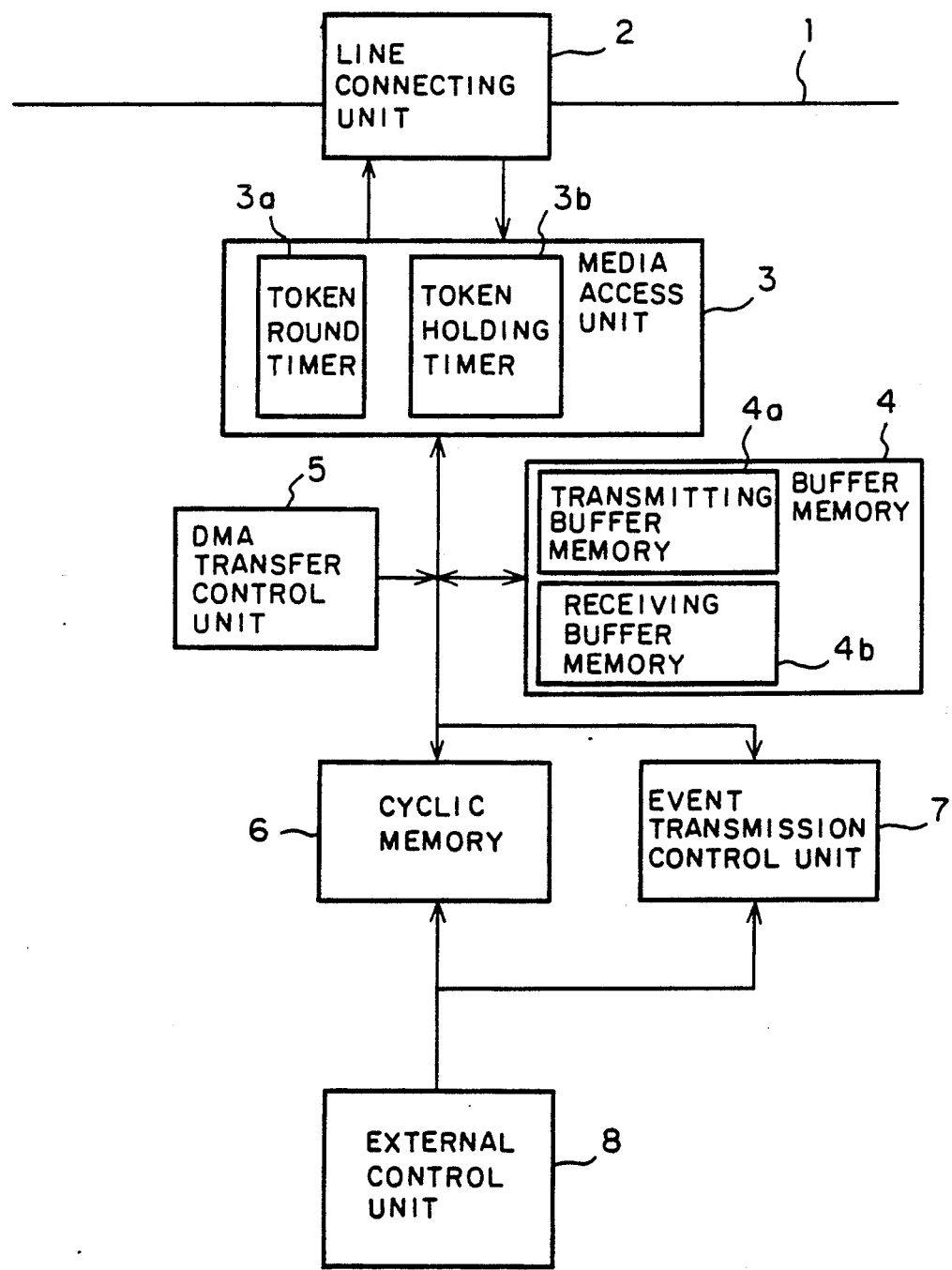
FIG. 1 is a block diagram of a conventional station in a control data way.
Figure 2:
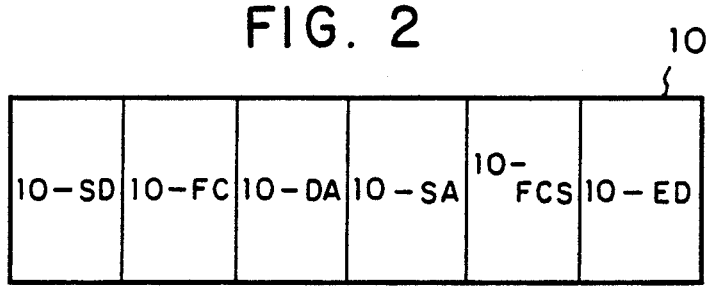
FIG. 2 is a diagram of a token frame.
Figure 3:
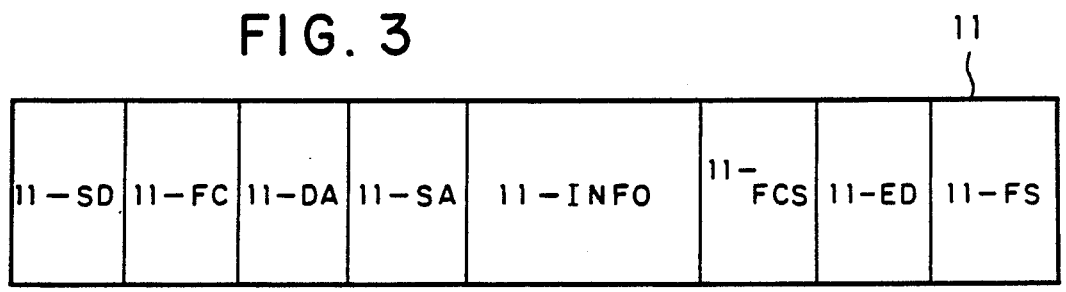
FIG. 3 is a diagram of a data frame.
Figure 4:
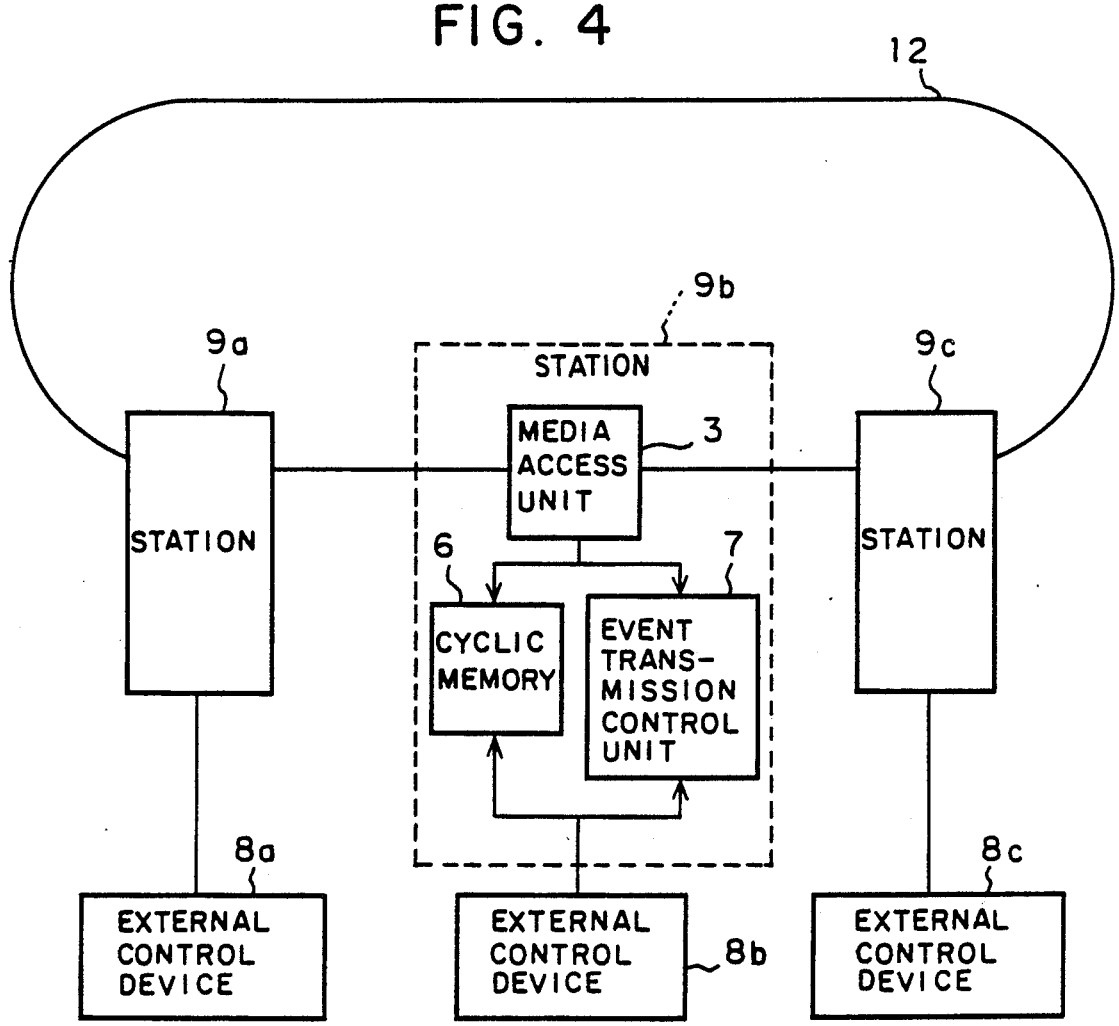
FIG. 4 is a schematic illustration of the whole of a control data way.
Figure 5A:
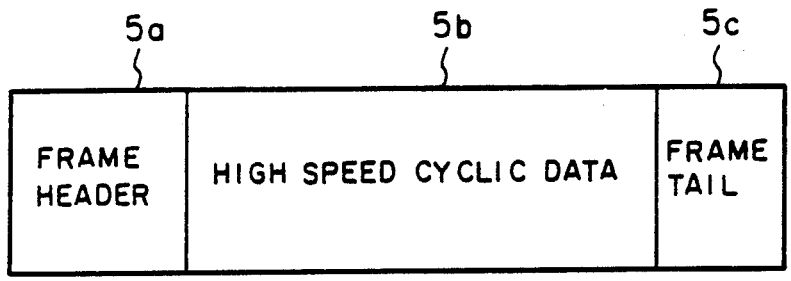
FIGS. 5a and 5b are diagrams of a conventional synchronous frame.
Figure 5B:
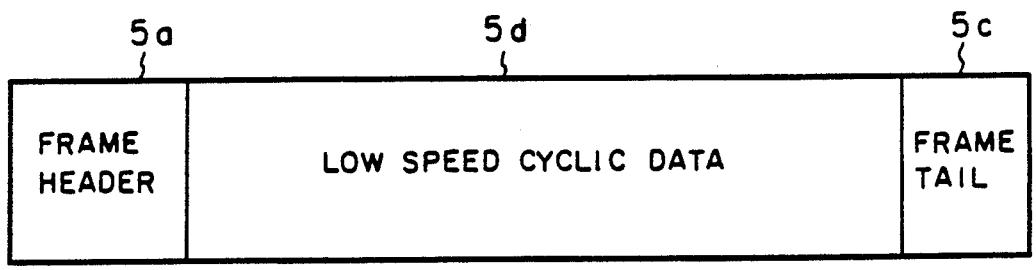

Next, the operation of the embodiment will be described. Here, a data frame is the same as the conventional arrangements shown in FIG. 3.

With such an arrangement, when a token frame 10 is acquired, the station "capturing" the token obtains the right of transmitting a data frame 11. At this time, the value of the token round timer 3a is copied in the token holding timer 3b, and the token round timer 3a is reset to start time-counting again.

Acquiring the right to transmit, the station transmits its own cyclic data which is queued in the transmitting buffer memory 4a for transmission as synchronous data.

During the transmission of this synchronous data, the time-counting of the token holding timer 3b remains stopped. After the transmission of the synchronous data is completed, the token holding timer 3b starts time-counting. If the asynchronous data is queued for transmission, it is possible to transmit the asynchronous data until the token holding timer 3b reaches timeout.

In this invention, the cyclic data of each station which is transmitted as synchronous data by acquiring one token is fixed in length, and the total sum of synchronous data transmitted by the whole of the loop is set always constant per one token rotation.

In this way, the token rotation time TRT in acquiring the token is always larger than the total sum of the time (Ts) for transmitting the synchronous data in the whole loop, and any station can not transmit asynchronous data over the time (TTRT−Ts−Td). In this case, the token rotation time becomes TTRT.

Figure 7A:
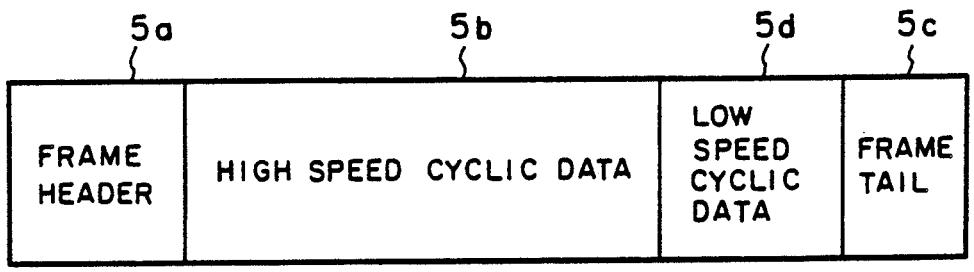
FIGS. 7a and 7b are diagrams of a synchronous frame according to this invention.
Figure 7B:
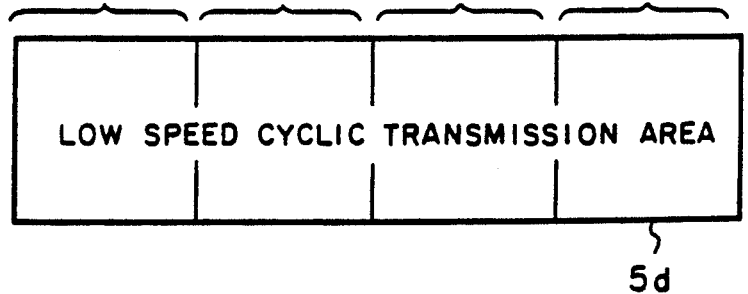

Then, the synchronous frame of each station transmitted by acquiring one token is comprised of the high speed cyclic data 5b and one portion of the low speed cyclic data 5d added with the former data as shown in FIG. 7. The fixed length data portions of the low speed cyclic data 5d are sequentially loaded into the synchronous data frames so as to complete the transmission of all the data thereof by transmitting several synchronous frames. The fixed data length is determined by the ratio of the high speed cyclic update period Tth to the low speed cyclic update period Ttl.

In this embodiment, upon reception of a token acquired signal, a DMA transfer control unit 5 produces a timing signal at which a synchronous data frame of the fixed length is written into a buffer memory 4a.

Incidentally, in the above-mentioned embodiment, the time of acquisition of the token is utilized as the timing at which the synchronous data is written into the transmitting buffer memory 4a. But, the synchronous data may be written into the transmitting buffer memory 4a in a fixed period shorter than TTRT. In this case, the synchronous data to be written has to be always of a fixed length.

Incidentally, in the above-mentioned embodiment, the high speed cyclic data 5b and the low speed cyclic data 5d are arranged into one synchronous frame. But, the both data (5b and 5d) may be made into separate frames, so as to compound the respective frames into a new frame, of a constant transmission time.

As described above, according to this invention, since the synchronous data transmitted after acquiring the token is set to a fixed length, there is obtained a cyclic data transmission method which enables lower device costs, improves the throughput of event transmission, and has a good response characteristic.

What is claimed is:

1. A cyclic data transfer method for controlling transmission and reception of control data in a loop shaped transfer line forming a network by means of a plurality of stations which are connected to the loop shaped transfer line and to each of the stations are connected outer control devices respectively, updating a synchronous data frame queued in a transmission buffer memory with data stored in a transmission area of a cyclic memory in each of said stations, and transmitting the synchronous data frame from said buffer memory to all of said plurality of stations, said cyclic data transfer method comprising the steps of:

producing a synchronous data frame of a fixed length in each of the stations from high speed cyclic data and a prescribed portion of low speed cyclic data so as to be transmitted by acquiring a token;

sequentially loading said prescribed portion of said low speed cyclic data into the synchronous data frame so as to complete transmission of all said low speed cyclic data over several synchronous data frame transmissions; and transmitting the synchronous frame of said fixed length into which said high speed cyclic data and said low speed cyclic data are integrated, upon the acquisition of said token.

2. A cyclic data transfer method according to claim 1, further comprising the step of writing the synchronous data frame of said fixed length into the transmission buffer memory at a writing timing controlled by a DMA transfer control unit upon receiving a token acquisition signal.

3. A cyclic data transfer method according to claim 1, further comprising the step of cyclically writing the synchronous data frame of said fixed length into the transmission buffer memory at a period shorter than a TTRT controlled by a DMA transfer control unit.

* * * * *